United States Patent [19]

Fuchs et al.

[11] Patent Number: 4,697,338

[45] Date of Patent: Oct. 6, 1987

[54] DEVICE FOR PREPARING A CUTTING TOOL

[75] Inventors: Werner Fuchs, Lausanne; Jean-Claude Rebeaud, Le Mont, both of Switzerland

[73] Assignee: Bobst SA, Switzerland

[21] Appl. No.: 770,746

[22] Filed: Aug. 29, 1985

[30] Foreign Application Priority Data

Aug. 31, 1984 [CH] Switzerland ........................ 4173/84

[51] Int. Cl.⁴ ............................................ B23P 11/00

[52] U.S. Cl. .................................. 29/799; 100/269 R

[58] Field of Search ......................... 29/465, 525, 799; 100/269 R

FOREIGN PATENT DOCUMENTS 717505 10/1954 United Kingdom .
1219786 1/1971 United Kingdom .
1399308 7/1975 United Kingdom .
1402096 8/1975 United Kingdom .
1548996 7/1979 United Kingdom .
2051635 4/1983 United Kingdom .

*Primary Examiner*—Timothy V. Eley
*Attorney, Agent, or Firm*—Hill, Van Santen, Steadman & Simpson

[57] ABSTRACT

A method and device are provided to prepare a cutting tool such as used for die cutting sheet material, by mounting the cutting members in a mounting support with the method and device controlling the operational stages of the preparation. The device includes improvements in the press which are that a plurality of individual pressure elements are arranged on a support surface of a lower bed in rows and columns to form a rectangular configuration with each of the elements being individually controlled so that different groups of elements can be actuated to act on a pressing plate depending on the size of the cutting tool being prepared. To insure an accurate and equal pressure, the elements in each corner are actuated with a low pressure to bring the pressing plate and the tool being acted on into contact with the pressure surface of the upper bed and then high pressure is applied to the selected pressure element to insure the securing of the cuttings blades and members into a support of the cutting tool.

4 Claims, 5 Drawing Figures

DEVICE FOR PREPARING A CUTTING TOOL

BACKGROUND OF THE INVENTION

The present invention is directed to a method and a press for use during mounting of cutting members in a support to form a cutting tool for die cutting sheet material, such as cardboard or paper, which is being processed in a die cutting machine.

There are presses which are used during mounting of cutting blades in a support for forming a cutting tool which presses have a pressure element which is designed as a complete, shiftable surface, pushing a punch against the tool. The fluid is applied under pressure in one single volume to the pressure element which is positioned between a lower support member or bed and the punch. According to the dimensions and the positioning of the punch in the press, the application of pressure to the pressure element during a pressing operation may cause an uncertain or irregular rise in the pressure element. Consequently, the operator achieving the setting might utilize a hazardous process. In addition, a pressure setting for a parallel and continuous rising of the pressing element causes a great waste of time and energy for actuating the device. Moreover, a problematic assembly of crosspieces connecting the upper and lower beds or support members is needed to secure a good working accuracy.

SUMMARY OF THE INVENTION

The object of the present invention is to provide an operator a device which saves time and energy during a setting operation and a device which provides the wanted regularity during the processing steps.

To accomplish these goals, the present invention is directed to an improvement in a press for use during a process of mounting blade members in a support or mounting plate to form a cutting tool for die cutting sheet material, said press having a lower platen or bed, an upper bed, means for holding the upper and lower beds with the desired space therebetween, pressure setting or applying means acting between one of the upper and lower beds and a plate member to urge the plate member towards the other of the upper and lower beds, and means for actuating the pressure setting means. The improvement is that the pressure applying means comprises a plurality of individual pressure elements each comprising a piston in a cylinder, said pressure elements being arranged on the one bed in a rectangular pattern with rows and columns, said means for actuating the pressure applying means including a pump for pumping fluid from a tank, a hydraulic supply circuit having a fluid distribution arrangement for applying a low pressure to each pressure element disposed in a corner of the rectangular pattern of pressure elements and conduits and valves to enable applying a high pressure to selected groups of pressure elements. In addition, the improvement to the press includes that the means for holding the upper and lower beds with a desired space therebetween includes two lateral frame members arranged on opposite sides of the upper and lower beds, each lateral frame being provided on an innerface with two longitudinal grooves receiving longitudinal keys provided on each lateral face of the upper and lower beds and means such as screws for holding the lateral frame tightly against the lateral surfaces of the upper and lower beds with the grooves receiving the keys.

The invention is also directed to a method for checking the preparation of a cutting tool or cutting die for use in die cutting sheets of material such as die cutting cardboard, which method comprises providing a press having an upper and lower bed held in a fixed space relationship, a plurality of pressure units being arranged on one of the upper and lower beds in rows and columns to form a rectangular arrangement, a pushing plate interposed between the other of the bed and the pressure elements; positioning a mounting plate on the pressure plate with the cutting members located thereon; applying a low pressure to each of the pressure elements arranged at the corners of the rectangular arrangement of the pressure elements to move the pushing plate toward the other bed and the mounting plate into engagement with the other bed; then applying a high pressure fluid to the selected group of pressure elements positioned beneath the mounting plate to urge the pushing plate towards the other bed and to press the cutting blades into the mounting plate to the desired depth; subsequently withdrawing the pressure from all of the pressure elements to cause a release of the pressure on the pushing member; and then removing the cutting tool from between the beds.

Other objects and advantages of the invention will be readily apparent from the following description, drawings and claims.

DESCRIPTION OF THE PREFERRED EMBODIMENT

Figure 1:
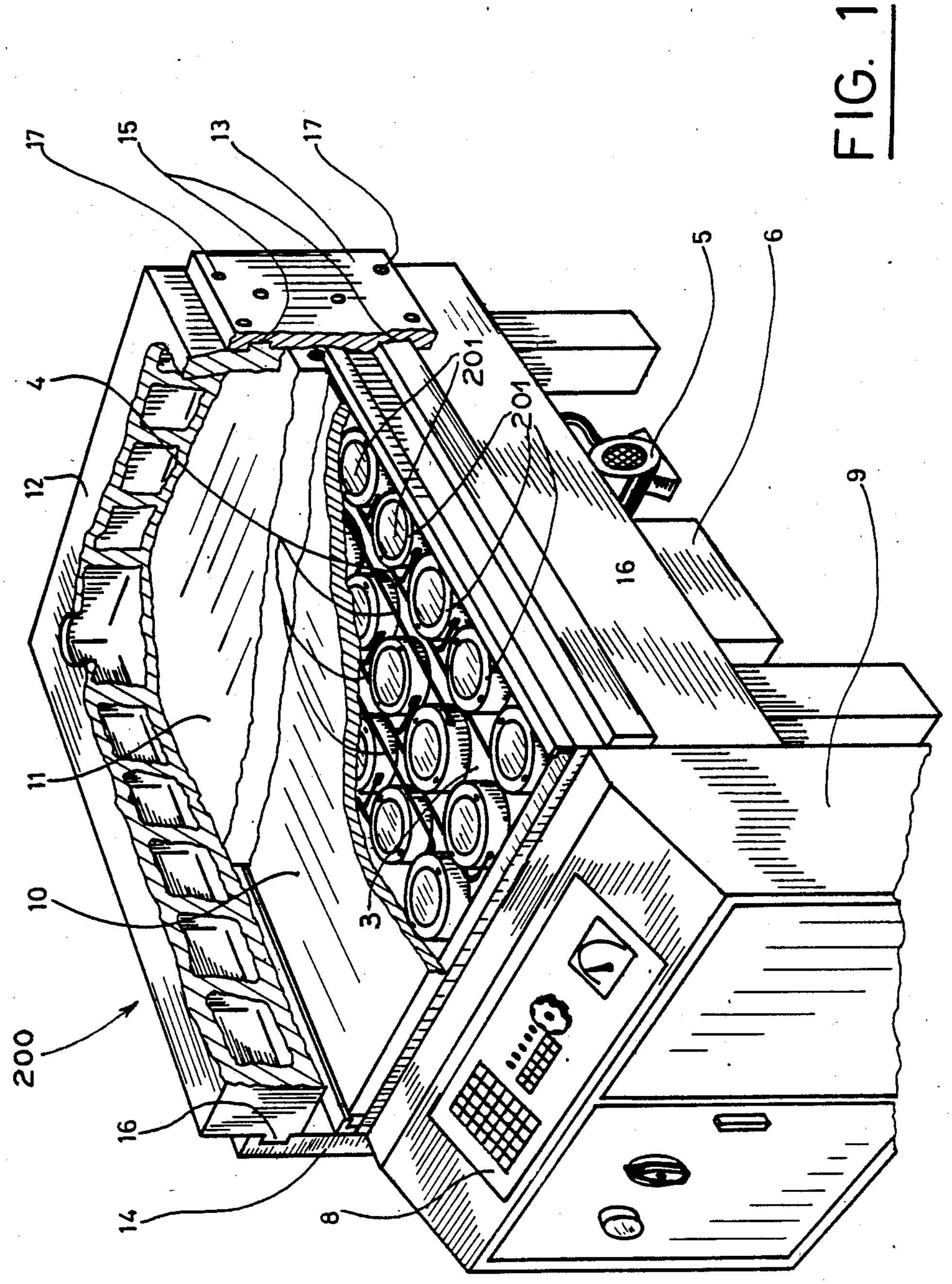
FIG. 1 is a perspective view, with portions broken away for purposes of illustration, of a press for mounting blade members in a support in accordance with the present invention.

The principles of the present invention are particularly useful when incorporated in a press generally indicated at 200 in FIG. 1. The device or press 200 includes a frame, which supports a lower bed 3 on which a plurality of pressure elements 201 are positioned in rows and columns to form a rectangular configuration. A plurality of conduits or pipes 4 supply the fluid to the pressure elements 201 and are arranged in the space between the various elements. Fluid under pressure is supplied to and removed from the pressure elements by a circuit which includes a pump 5 receiving a fluid from a tank 6. Control of the various valves of the fluid circuit as well as the pump is done by an operator from a control panel 8 which is mounted on an upper surface of a housing 9 containing the various individual control elements. A pushing plate 10 rests on the pressure elements 201 and supports a cutting tool 11 which is formed of a plurality of blade members mounted in a board-like support.

The device 200 also includes an upper bed or support member 12 which is rigidly attached to the lower bed 3 by holding means which is preferably formed by lateral frame members 13 and 14. A precise distance between these lower and upper beds 3 and 12 respectively is provided by two grooves 15 which are milled in each of the frame members 13 and 14 and receive keys 16 which have been machined in the lateral faces of each of the beds. The beds and frames are secured together by fastening means such as screws 17 which are placed on each side of the grooves.

Figure 2:
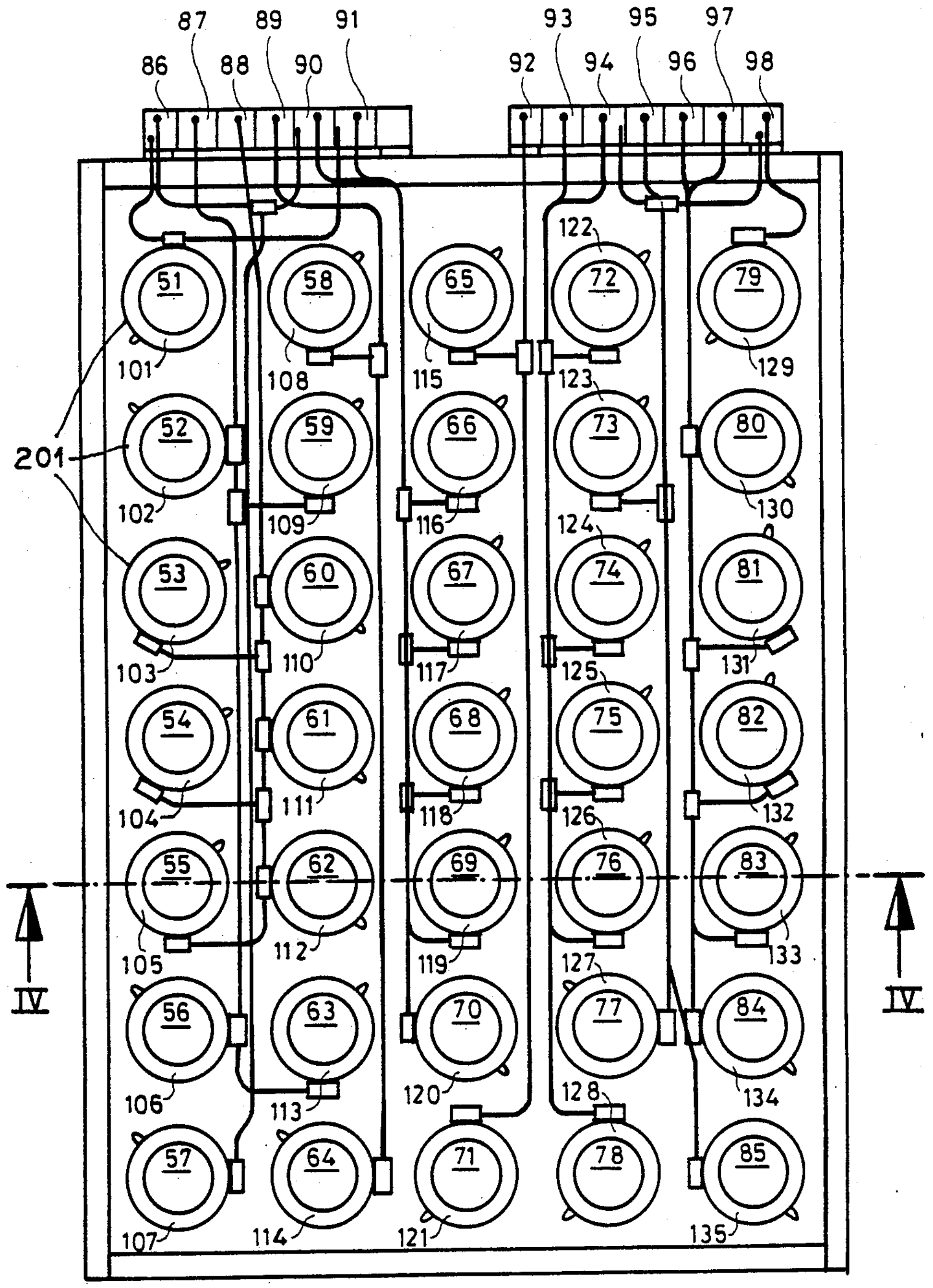
FIG. 2 is a plan view of a lower bed of the press illustrating the position of the various individual pressure elements and the supplying of fluid pressure thereto.

As best illustrated in FIG. 2, there are 35 individual pressing elements 201 which are arranged in rows and columns to form a rectangular configuration. As illustrated, each of the pressing elements comprises a piston received in a cylinder. In FIG. 2, the pistons are numbered 51–85 and the respective cylinders are numbered 101–135. To supply fluid to each of the cylinders as mentioned hereinabove, a plurality of pipes or conduits 4 are provided. To control the flow of the fluid to the various cylinders, a series of valves 86–98 are provided.

As illustrated, in FIG. 2 two pipes leave the valve 86 and extend to cylinders 101 and 107. In a similar manner, two pipes leave the valve 98 and extend to the cylinders 129 and 135. The four pistons 51, 57, 79 and 85 which are received in the cylinders 101, 107, 129 and 135 will raise the pushing plate parallelly to its job starting plane under the action of a lower pressure. After reaching the job starting plane, the elevated pushing plate 10 can then be acted on at its high pressure to cause the mounting of the blade members in the support. The high pressure cannot be provided before the plate has been elevated to the job starting plane.

A pipe connects the valve 88 with six cylinders 103, 104, 105, 110, 111 and 112. The six pistons 53, 54, 55, 60, 61 and 62 which are received in these six cylinders are always operated simultaneously be it with or without area selection and with the high pressure control. The area occupied by the six pistons is a minimum format of the wanted tool. The complete area covered by all of the 35 pistons 51 through 85 and thus the whole area of the pushing plate 10 is the maximum format of the tool. The number of pistons used can be selected so that intermediate formats can be processed.

In order to selectively actuate selected numbers of the other pressure elements, the valve 87 is connected by a pipe to each of the cylinders 102, 106, 109 and 113. A valve 89 is connected by a pipe to cylinders 108 and 114. A pipe leads from the valve 90 to cylinders 117, 118 and 119 while a pipe leads from the valve 91 to cylinders 116 and 120. Valve 92 is connected to cylinders 115 and 121 by a pipe while another pipe leads from valve 93 to cylinders 122 and 128. Valve 94 is connected by a pipe to cylinders 124, 125 and 126. Valve 95 is connected by a pipe to cylinders 123 and 127. A pipe leads from valve 96 to cylinders 131, 132 and 133 and another pipe will lead from valve 97 to cylinders 130 and 134.

Figure 3:
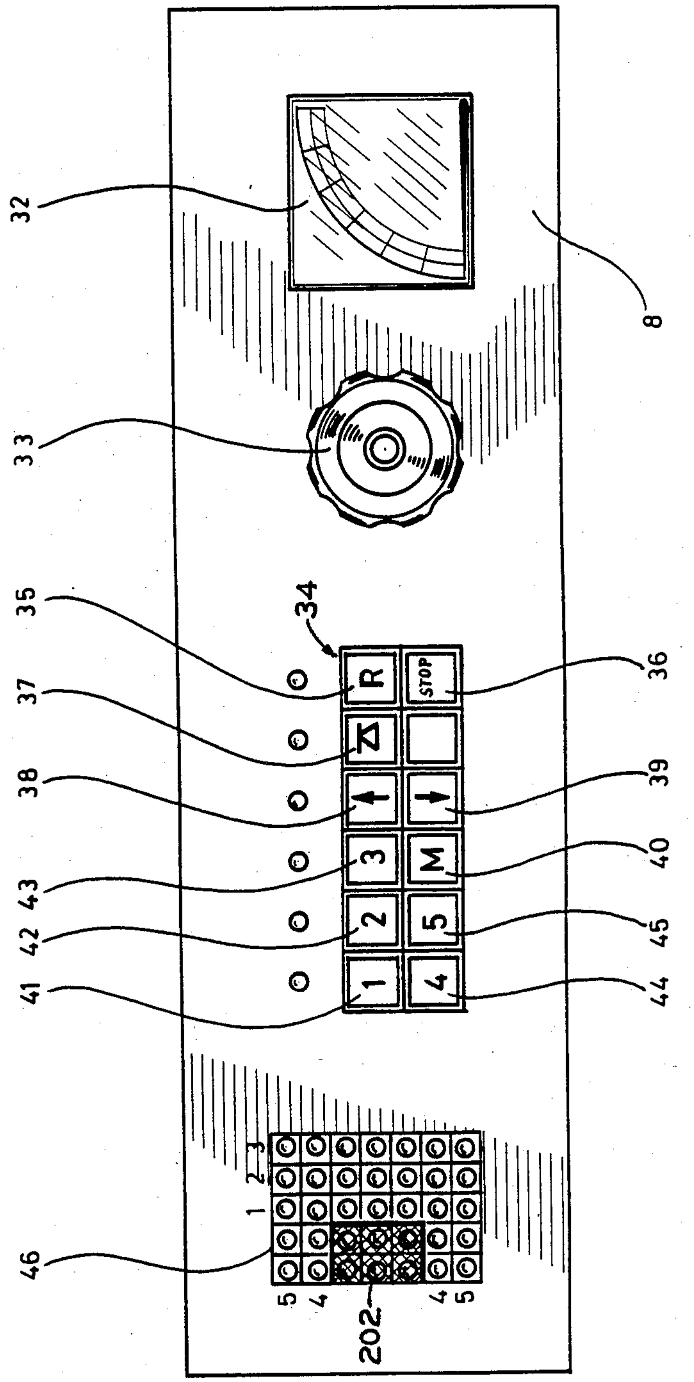
FIG. 3 is a plan view of the control panel for the device of the present invention.

FIG. 3 shows a control panel 8 of the device and the possibilities provided for the operator. As shown, the control panel has a pressure gauge 32 which displays the pressure generated in the hydraulic circuit by a pressure setting wheel 33. A keyboard generally indicated at 34 has a plurality of push-buttons 35–45. Each of these buttons has a specific function, for example, the button 35 calls for the memorized working area while the button 36 stops the pump. Button 37 creates a high pressure while pressure 38 causes a raising of the pushing plate 10 and button 39 causes a lowering of the pushing plate 10. Button 40 causes memorizing of a selected working area. Buttons or keys 41, 42, 43, 45 and 46 are used to select particular working areas which will be discussed hereinafter.

The control panel 8 also has a light panel 46 which shows in reduction the layout of the pistons or 35 pressure elements. In addition, it will show with light signals the selected areas. The selection possibilities depend on the format of the tool to be constructed, i.e., if none of the push-buttons 41 through 45 are actuated, the pistons 53, 54, 55, 60, 61 and 62 raise when a high pressure drive button 37 is actuated. However, two conditions are needed for the high pressure drive to be actuated. The four pistons 51, 57, 79 and 85 have to have achieved their initial rising under the action of low pressure and the high pressure given in the circuit by the pump 5 must be effective. When these conditions are met, a light signal will indicate to the operator that the high pressure striking or pressing of the tool can be ordered. Any format selected on the keys 41 and 45 will actuate the six pistons 53, 54, 55, 60, 61 and 62 with the pistons of the selected area as any tool format is positioned against the left edge of the pushing plate 10 and centered longitudinally. It is noted that the six cylinders or pressure elements that will be actuated in all instances are indicated in the light board or panel 46 by the double cross-hatch 202. It should be noted that the remaining 29 lights are identified by vertical rows 1, 2 and 3 and two horizontal rows 4 and two horizontal rows 5.

As mentioned hereinabove, if only key 41 is depressed, in addition to valve 88 opening to apply pressure to the six selected pistons, valve 90 is actuated to apply pressure to cylinders 117, 118 and 119 so that pistons 53–55, 60–62 and 67–69 are elevated. In the light board this means that the three lights immediately adjacent the initial block 202 in row 1 will also be lit up so that nine lights are lit up.

By depressing both keys 41 and 42, three valves 88, 90 and 94 are opened to supply fluid to cylinders 103, 104, 105, 110, 111, 112, 117, 118, 119, 124, 125 and 126. This will cause pistons 53–55, 60–62, 67–69 and 74–76 to be actuated. When this occurs, the six lights in rows 1 and 2 which are immediately aligned with the six lights, grouping 202, are lit.

If buttons 41, 42 and 43 are depressed or actuated together, then valves 88, 90, 94 and 96 are opened to apply fluid to cylinders 103–105, 110–112, 117–119, 124–126 and 131–133. This will cause actuation of pistons 53–55, 60–62, 67–69, 74–76 and 81–83. This actuation will be indicated on the light panel 46 by the nine lights immediately adjacent the grouping 202 that are in rows 1, 2 and 3 being lit.

By selecting or actuating only button 44, only valves 88 and 87 are actuated and only cylinders 102–106 and 109–113 will have pressure applied thereto to actuate the pistons 52–56 and 59–63. This will be indicated by the light board 46 in which the two lights in rows 4 immediately adjacent the grouping 202 will be lit up. If keys 44 and 46 are depressed, then valves 88 and 87 as well as 89 and 86 will be actuated so that cylinders 101–114 will all have fluid under high pressure applied thereto so that pistons 51–64 are actuated. This means all the lights in the two numbered vertical rows in the panel 46 will be lit.

By depressing keys 41 and 44, valves 87, 88, 90 and 91 are actuated which means that fluid under high pressure will go to cylinders 102–106, 109–113 and 116–120. This will cause the actuation of pistons 52–56, 59–63 and 66–70. This will be indicated by all of the lights except those in rows 2, 3 and 5 being lit.

If keys 41, 42 and 44 are depressed, valves 87, 88, 90, 91, 94 and 95 will be actuated. This means that fluid under high pressure will be applied to cylinders 102–106, 109–113, 116–120, 123–127 to actuate pistons 52–56, 59–63, 66–70 and 73–77. This will be indicated on the light panel 46 by all of the lights except those in rows 3 and 5 being lit.

By depressing keys 41, 42, 43 and 44 together, the valves 87, 88, 90, 91 94, 95, 96 and 97 will be actuated to apply fluid to their respective cylinders. Thus, cylinders 102–106, 109–113, 116–120, 123–127 and 130–134 will receive fluid under high pressure and the pistons 52–56, 59–63, 66–70, 73–77 and 80–84 will be actuated. This will also be indicated on the light panel 46 by all lights of the panel being lit except those in the two horizontal rows 5.

By selecting or depressing keys 41, 44 and 45, valves 86, 87, 88, 89, 90, 91 and 92 will be operating to cause fluid under high pressure to applied to cylinders 101–121. This will cause pistons 51–71 to be actuated and means that all the lights of the panel 46 will be lit except the lights in the two vertical rows 2 and 3.

By depressing keys 41, 42, 44 and 45, valves 86–95 are actuated to apply fluid under pressure to cylinders 101–128 to actuate pistons 51–78. This will be indicated on the light panel 46 by all of the lights except those in vertical row 3 being lit.

Finally, by closing all of the keys 41–45, all of the valves 86–98 are opened to apply fluid under high pressure to all of the cylinders 101–135. This causes all of the pistons 51–85 to be actuated. In addition, this will cause all of the 35 lights on the light panel 46 to be lit.

While it is not illustrated, the control of the various valves in response to the actuation of the various keys can be accomplished by a logic circuit. For example, it is noted that keys 41 and 44 must be depressed to actuate valve 91 while keys 42 and 44 must be depressed to cause valve 95 to be actuated. In a similar manner, valve 97 requires both keys 43 and 44 to be actuated and valve 92 requires both keys 41 and 45 to be actuated. The actuation of keys 42 and 45 is necessary to cause valve 93 to open and the actuation of keys 43 and 45 is necessary for actuating or opening the valve 98.

Figure 4:
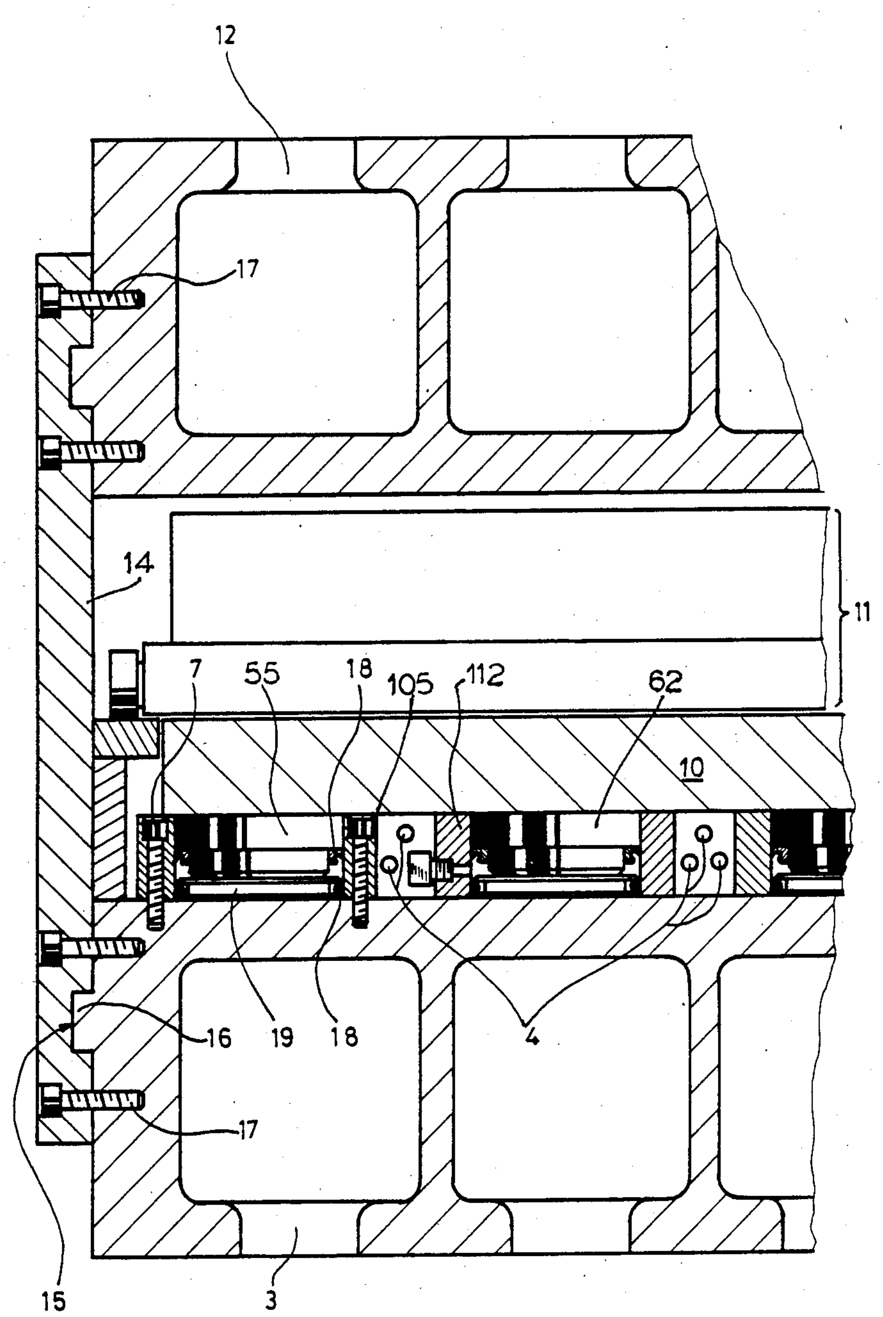
FIG. 4 is a partial cross-sectional view taken along IV—IV of FIG. 2 with portions in elevation for purposes of illustration of a press of the present invention.

As best illustrated in FIG. 4, each of the pressure elements 201 include a piston such as 55 which is received in a cylinder such as 105. In addition, each of the cylinders receives a collar 19. To insure no leakage of the fluid, each of the pistons has a shoulder, which is provided with a seal 18 and each of the collars 19 is also provided with a seal 18. The cylinders, such as the cylinder 105, are each secured to the lower bed 3 by fastening arrangement such as screws 7. In addition to illustrating the structure of each of the pressure elements 201, FIG. 4 shows the coaction of keys 16 in the grooves 15 of a frame element 14 and how the frame element is secured to its responsive bed 3 and 12 by the screws 17. Also, it is noted that the holder and blades forming the tool 11 is on a carriage which is rolled on a track to enable insertion between the pressing member 10 and the upper bed 12.

Figure 5:
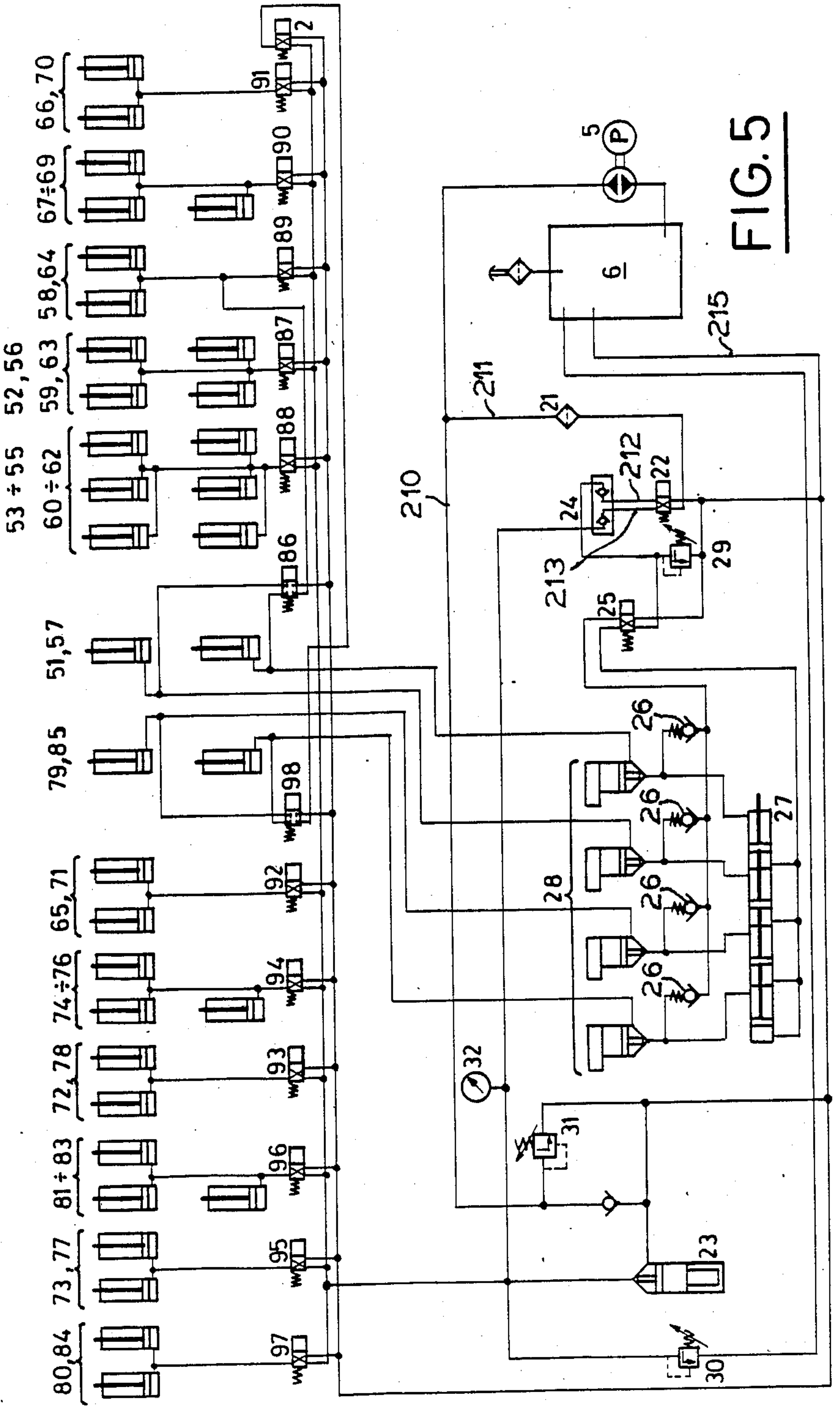
FIG. 5 is a hydraulic circuit diagram of the device of the present invention.

As illustrated by the hydraulic circuit diagram of FIG. 5, the pump 5 draws fluid from the tank 6 and discharges it through an outlet line 210. From the outlet line 210, a branch 211 passes through a filter 21 to a contrl valve 22. In one setting of the control valve 22, fluid is conducted through line 212 and a double check valve 24 to a selection valve 25 for supplying the fluid under pressure to an outlet circuit of a four-way distributor 27 through nonreturn or check valves 26. The low pressure of the four-way distributor 27 is applied by actuation of the valves 28 to each of the pistons 51, 57, 79 and 80 which are located in the corners of the arrangement of pressure elements to raise the pushing plate 10. The low pressure in this circuit is achieved by an oil pressure limiter 29 which discharges to a return line 215 extending to the tank 6. The distributor 27 secures a regular rise of the pushing plate 10 as well as perpendicular movement with regard to its plane.

As soon as a rise of the pressure plate 10 is achieved, the valve 22 is shifted to a high pressure setting wherein the output in the line 211 is connected to a line 213 to pass through the check valve 24 and to each of the valves 87–97 and also to a valve 2. The pressure in line 213 is measured by the gauge 32 and is determined by oil pressure limiter 30 which is adjusted by the knob 33 (FIG. 3). The maximum pressure in the entire system is controlled by an oil pressure limiter 31. In this arrangement, depending on which of the keys 41–45 are depressed, the various valves 2 and 86–98 are opened to actuate the various combinations of the pistons 51–85. It is noted, that the connection of high pressure fluid to the valve 86 will occur when the valve 89 is actuated and the actuation of the valve 2 will connect the high pressure line to the valve 98.

After achieving the striking or pushing of the tool arrangement to complete the checking of the mounting of the blade members in the support, the pushing plate 10 can be lowered in the following manner. The pump has its direction of rotation reversed to create a suction in line 210, the valve 23 is opened to apply this suction to each of the opened valves 2 and 86–89 to retract each of the pistons in their respective cylinders. With the downstroke of all of the pistons, the pushing plate 10 with the cutting tool 11 will be lowered to enable removal.

Although various minor modifications may be suggested by those versed in the art, it should be understood that we wish to embody within the scope of the patent granted herein, all such modifications as reasonably and properly come within the scope of our contribution to the art.

We claim:

1. In a press for acting on a cutting tool for die cutting sheet material, said press having a lower bed, an upper bed, means for holding the upper and lower beds with a desired spacing therebetween, pressure applying means acting between the lower bed and a plate member to urge the plate member towards the upper bed and means for actuating the pressure applying means the improvement comprising the pressure applying means comprising a plurality of individual pressure elements being arranged in rows and columns on the lower bed to form a rectangular configuration with four corners, a pushing plate resting on all the pressure elements, and wherein the means for actuating the pressure applying means including a pump for creating fluid under low pressure and a fluid distribution arrangement including low pressure lines extending to the pressure elements disposed in each of the corners of the rectangular configuration and a high pressure fluid system including valves to enable selectively applying high pressure to the pressure elements.

2. In a press for acting on a cutting tool for sheet material, said press having a lower bed, an upper bed, means for holding the upper and lower beds with a desired space therebetween, a plate member, pressure applying means acting between one of the beds and said plate member to urge the plate member towards the other of the beds, and means for actuating the pressure applying means, the improvements comprising said means for holding including each of the upper and lower beds on a pair of opposite lateral surfaces being provided with longitudinally extending keys, a lateral frame member having two spaced longitudinal grooves being secured to each of the pair of lateral surfaces with the grooves receiving the keys to hold the two beds at a predetermined spacing therebetween, and the pressure applying means including a plurality of individual pressure elements being arranged in rows and columns to form a rectangular configuration with four corners, each of said pressure elements including a cylinder with a piston therein, said pressure applying means including a pushing plate resting on the pressure elements, a pump for pumping a fluid from a tank to each of the pressure elements, control means for applying fluid under low pressure to each of the pressure elements disposed at the four corners of the rectangular configuration to raise the pushing plate to an operating position and for applying a high pressure to selected groups of the total number of pressure elements so that pressure is applied to an area of the pushing plate corresponding to the size of the area of the cutting tool being positioned thereon.

3. In a press according to claim 2, wherein each of the pressure elements includes a piston having a shoulder receiving an annular seal slidably engaging the inner wall of the cylinder, a collar received in the cylinder receiving an annular seal to seal the collar to the cylinder, each of the cylinders having a port for receiving the fluid supply and said cylinders being secured to an upper surface of the lower bed.

4. In a press according to claim 2, wherein the pressure applying means includes a control means having a control panel, said control panel having function keys, keys for actuating various combinations of pressure elements, a light panel indicating which pressure elements are being actuated, a pressure gauge, and means for varying the pressure setting, said control means includes a high pressure circuit having valves for applying a fluid under high pressure to selected groups of pressure elements, a low pressure circuit including a four-way distributor and a valve for each of the pressure elements disposed in the corners of the rectangular configuration of pressure elements, valve means including check valves for directing fluid from the pump into the high pressure circuit and selectively into the high pressure circuit and the low pressure circuit and electrical means actuated by the function keys to actuate various combination of the valves for the high pressure circuit.

* * * * *